(12) United States Patent
Kim et al.

(10) Patent No.: US 9,376,007 B2
(45) Date of Patent: *Jun. 28, 2016

(54) POWER TRANSMISSION SYSTEM OF HYBRID ELECTRIC VEHICLE

(75) Inventors: Kyungha Kim, Yongin-si (KR); Hee Ra Lee, Anyang (KR); Baekyu Kim, Suwon-si (KR); Yeonho Kim, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 325 days.

This patent is subject to a terminal disclaimer.

(21) Appl. No.: 13/310,442

(22) Filed: Dec. 2, 2011

(65) Prior Publication Data

US 2012/0322602 A1   Dec. 20, 2012

(30) Foreign Application Priority Data

Jun. 20, 2011   (KR) .................. 10-2011-0059759

(51) Int. Cl.
*F16H 3/66* (2006.01)
*B60K 6/44* (2007.10)
*B60W 10/08* (2006.01)
(Continued)

(52) U.S. Cl.
CPC ............... *B60K 6/445* (2013.01); *B60K 6/365* (2013.01); *B60L 11/123* (2013.01); *B60L 11/14* (2013.01); *F16H 3/728* (2013.01); *F16H 2037/0873* (2013.01); *F16H 2200/2007* (2013.01); *F16H 2200/2038* (2013.01); *F16H 2200/2041* (2013.01); *Y02T 10/6217* (2013.01);
(Continued)

(58) Field of Classification Search
CPC ........... F16H 3/66; F16H 3/663; F16H 3/666; F16H 3/728; B60K 6/365; B60K 6/445; B60K 1/00; B60K 1/02; B60K 6/44; B60W 20/00; B60W 10/08
USPC ............. 475/286, 290, 296, 323; 180/65.225, 180/65.6, 65.7; 903/903, 946, 911
See application file for complete search history.

(56) References Cited

U.S. PATENT DOCUMENTS 7,288,041 B2   10/2007   Bucknor et al.
7,473,199 B2 *  1/2009   Bucknor et al. .................. 475/5

(Continued)

FOREIGN PATENT DOCUMENTS

CN   101628541 A   1/2010
CN   102050003 A   5/2011

(Continued)

*Primary Examiner* — Colby M Hansen
(74) *Attorney, Agent, or Firm* — Morgan, Lewis & Bockius LLP

(57) ABSTRACT

A power transmission system of a hybrid electric vehicle includes an input shaft, a first planetary gear set having a first rotation element, a second rotation element directly connected to the input shaft, and a third rotation element directly connected to a first motor/generator, a second planetary gear set having a fourth rotation element directly connected to the first rotation element and a second motor/generator, a fifth rotation element, and a sixth rotation element selectively connected to the second rotation element, an output gear connected to the fifth rotation element, a first clutch selectively connecting the engine with the input shaft, a second clutch selectively connecting the second rotation element with the sixth rotation element, a first brake interposed between the third rotation element and a transmission housing, and a second brake interposed between the sixth rotation element and the transmission housing.

5 Claims, 10 Drawing Sheets

(51) Int. Cl.
  *B60K 6/445* (2007.10)
  *B60K 6/365* (2007.10)
  *F16H 3/72* (2006.01)
  *B60L 11/12* (2006.01)
  *B60L 11/14* (2006.01)
  *F16H 37/08* (2006.01)
(52) U.S. Cl.
  CPC ............ *Y02T10/6239* (2013.01); *Y02T 10/648* (2013.01); *Y02T 10/7077* (2013.01)

(56) References Cited

U.S. PATENT DOCUMENTS

| | | | |
|---|---|---|---|
| 8,303,447 | B1 | 11/2012 | Kim et al. |
| 8,313,401 | B2 * | 11/2012 | Kim et al. ............ 475/5 |
| 8,435,147 | B2 * | 5/2013 | Kim et al. ............ 475/5 |
| 2005/0252703 | A1 | 11/2005 | Schmidt et al. |
| 2006/0111213 | A1 | 5/2006 | Bucknor et al. |
| 2006/0240928 | A1 | 10/2006 | Raghavan et al. |
| 2007/0197335 | A1 | 8/2007 | Raghavan et al. |
| 2009/0093330 | A1 | 4/2009 | Kumazaki et al. |
| 2010/0227723 | A1 | 9/2010 | Seo et al. |
| 2011/0053724 | A1 | 3/2011 | Phillips |
| 2011/0111906 | A1 * | 5/2011 | Kim et al. ............ 475/5 |
| 2012/0052999 | A1 | 3/2012 | Kim et al. |

FOREIGN PATENT DOCUMENTS

| | | |
|---|---|---|
| CN | 101830163 A | 9/2011 |
| JP | 2005-180243 A | 7/2005 |
| JP | 2005-186736 A | 7/2005 |
| JP | 4007403 B1 | 9/2007 |
| JP | 4102423 B2 | 3/2008 |
| JP | 2009-190455 A | 8/2009 |
| JP | 2011-98712 A | 5/2011 |
| KR | 10-0969084 B1 | 7/2010 |
| KR | 10-2010-0101306 A | 9/2010 |
| KR | 10-2010-028372 A | 12/2010 |
| KR | 10-2011-0006907 A | 1/2011 |
| KR | 10-2011-0062140 A | 6/2011 |

\* cited by examiner

FIG. 2

| Mode | | CL1 | CL2 | BK1 | BK2 |
|---|---|---|---|---|---|
| EV mode | EV1 | | | | ON |
| | EV2 | | ON | | |
| | EV3 | | ON | | ON |
| Torque split mode | Input Split mode | ON | | | ON |
| | Compound Split mode | ON | ON | | |
| Fixed shift-speed mode [FIXED Gears] | OD | ON | ON | ON | |

US 9,376,007 B2

POWER TRANSMISSION SYSTEM OF HYBRID ELECTRIC VEHICLE

CROSS-REFERENCE TO RELATED APPLICATION

This application claims priority to and the benefit of Korean Patent Application No. 10-2011-0059759 filed Jun. 20, 2011, the entire contents of which application is incorporated herein for all purposes by this reference.

BACKGROUND OF INVENTION

1. Field of Invention

The present invention relates to a power transmission system of a hybrid electric vehicle. More particularly, the present invention relates to a power transmission system of a hybrid electric vehicle which realizes three EV modes, two torque split mode, and one fixed shift-speed mode.

2. Description of Related Art

Generally, a hybrid electric vehicle is a vehicle driven by at least two different types of power sources.

Such a hybrid electric vehicle typically includes an engine and a motor/generator. The hybrid electric vehicle uses a motor/generator having relatively better low-speed torque characteristics as a main power source at a low-speed and uses an engine having relatively better high-speed torque characteristics as a main power source at a high-speed.

Since the hybrid electric vehicle stops an operation of an engine using fossil fuel and uses a motor/generator at a low-speed region, fuel consumption may be improved and exhaust gas may be reduced.

The power transmission system of a hybrid electric vehicle is classified into a mono-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the mono-mode type.

Since the multi-mode type has high efficiency and is able to multiply torque autonomously, the multi-mode type can be applied to a full size vehicle.

Therefore, the multi-mode type instead of the mono-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear set, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a power transmission system of a hybrid electric vehicle having advantages of realizing three EV modes, two torque split modes an input split mode and a compound split mode, and one fixed shift-speed mode.

A power transmission system of a hybrid electric vehicle according to various aspects of the present invention may include an input shaft selectively connected to an engine, a first planetary gear set having first, second, and third rotation elements, wherein the second rotation element is directly connected to the input shaft and the third rotation element is directly connected to a first motor/generator, a second planetary gear set having fourth, fifth, and sixth rotation elements, wherein the fourth rotation element is directly connected to the first rotation element of the first planetary gear set and a second motor/generator, and the sixth rotation element is selectively connected to the second rotation element of the first planetary gear set, an output gear connected to the fifth rotation element of the second planetary gear set, a first clutch selectively connecting the engine with the input shaft, a second clutch selectively connecting the second rotation element of the first planetary gear set with the sixth rotation element of the second planetary gear set, a first brake interposed between the third rotation element of the first planetary gear set and a transmission housing, and a second brake interposed between the sixth rotation element of the second planetary gear set and the transmission housing.

The first planetary gear set may be a single pinion planetary gear set having a first sun gear, a first planet carrier, and a first ring gear as rotation elements thereof, wherein the first sun gear is directly connected to the fourth rotation element of the second planetary gear set, the first planet carrier is directly connected to the input shaft and is selectively connected to the sixth rotation element of the second planetary gear set, and the first ring gear is connected to the first motor/generator and is selectively connected to the transmission housing through the first brake.

The second planetary gear set may be a single pinion planetary gear set having a second sun gear, a second planet carrier, and a second ring gear as rotation elements thereof, wherein the second sun gear is connected to the first sun gear of the first planetary gear set and the second motor/generator, the second planet carrier is connected to the output gear, and the second ring gear is selectively connected to the first planet carrier of the first planetary gear set through the second clutch and is selectively connected to the transmission housing through the second brake.

The engine may include a starting device.

A power transmission system of a hybrid electric vehicle according to other aspects of the present invention may include a first planetary gear set having a first sun gear, a first planet carrier, and a first ring gear as rotation elements thereof, a second planetary gear set having a second sun gear, a second planet carrier, and a second ring gear as rotation elements thereof, first and second motor/generators adapted to be operated as a motor or a generator, and a torque delivery apparatus including first and second clutches and first and second brakes, wherein the first sun gear is directly connected to the second sun gear, the first planet carrier is directly connected to an input shaft selectively connected to an engine through the first clutch and is selectively connected to the second ring gear through the second clutch, the first ring gear is connected to the first motor/generator and is selectively connected to a transmission housing through the first brake, the second sun gear is connected to the second motor/generator, the second planet carrier is directly connected to an output gear, and the second ring gear is selectively connected to the transmission housing through the second brake.

The first planetary gear set and the second planetary gear set may be single pinion planetary gear sets.

The second brake is operated at an EV1 mode, the second clutch is operated at an EV2 mode, the second clutch and the second brake are operated at an EV3 mode, the first clutch and the second brake are operated at an input split mode, the first clutch and the second clutch are operated at a compound split mode, and the first clutch, the second clutch, and the first brake are operated at a fixed shift-speed mode.

A power transmission system of a hybrid electric vehicle according to other aspects of the present invention may include a first planetary gear set having a first sun gear, a first planet carrier, and a first ring gear as rotation elements thereof, a second planetary gear set having a second sun gear, a second planet carrier, and a second ring gear as rotation elements thereof, first and second motor/generators adapted to be operated as a motor or a generator, and a torque delivery apparatus including one clutch and two brakes, wherein the first sun gear is directly connected to the second sun gear, the first planet carrier is directly connected to an input shaft connected to an engine and is selectively connected to the second ring gear through a clutch, the first ring gear is connected to the first motor/generator and is selectively connected to a transmission housing through a first brake, the second sun gear is connected to the second motor/generator, the second planet carrier is directly connected to an output gear, and the second ring gear is selectively connected to the transmission housing through a second brake.

The first planetary gear set and the second planetary gear set may be single pinion planetary gear sets.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of torque delivery apparatus at each operation mode applied to an exemplary power transmission system according to the present invention.

DETAILED DESCRIPTION

Figure 1:
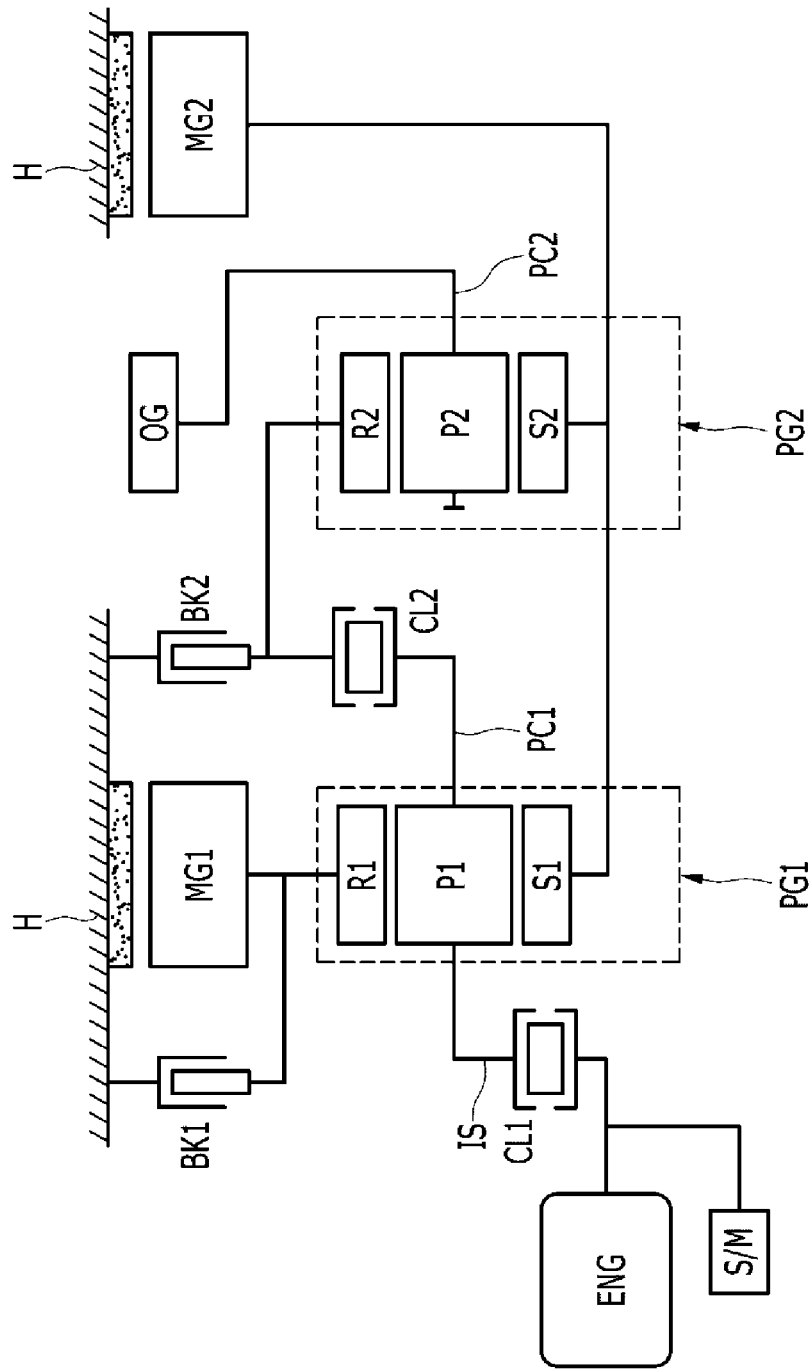
FIG. 1 is a schematic diagram of an exemplary power transmission system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to various embodiments of the present invention.

Referring to FIG. 1, a power transmission system of a hybrid electric vehicle according to various embodiments of the present invention receives torque of an engine ENG that is a power source through an input shaft IS, changes the torque according to a running state of a vehicle, and outputs the changed torque through an output gear OG.

The power transmission system includes first and second planetary gear sets PG1 and PG2, first and second motor/generators MG1 and MG2, and a torque delivery apparatus consisting of first and second clutches CL1 and CL2 and first and second brakes BK1 and BK2.

A rotation element of the first planetary gear set PG1 is directly connected to a rotation element of the second planetary gear set PG2, and another rotation element of the first planetary gear set PG1 is selectively connected to another rotation element of the second planetary gear set PG2, such that the first planetary gear set PG1 and the second planetary gear set PG2 operate as one compound planetary gear set.

The first motor/generator MG1 and the second motor/generator MG2 are independent power sources, and are operates as a motor and a generator as well known to a person of an ordinary skill in the art.

The first motor/generator MG1 is connected to the other rotation element of the first planetary gear set PG1 so as to operate as a motor supplying torque to the other rotation element or to operate as a generator generating electricity by torque of the other rotation element.

The second motor/generator MG2 is connected to the rotation element of the second planetary gear set PG2 so as to operate as a motor supplying torque to the rotation element or to operate as a generator generating electricity by torque of the rotation element.

For this purpose, the first motor/generator MG1 and the second motor/generator MG2 have stators fixed to a transmission housing H and rotors connected to the other rotation element of the first planetary gear set PG1 and the rotation element of the second planetary gear set PG2, respectively.

In addition, the engine ENG includes a starting device S/M so as to be started on occasion demands.

That is, the engine ENG is started by using the starting device S/M at an operating mode where the first clutch CL1 does not operate.

The first clutch CL1 selectively connects the engine with the input shaft IS, and the second clutch CL2 selectively connects another rotation element of the first planetary gear set PG1 with another rotation element of the second planetary gear set PG2.

The first brake BK1 is disposed in parallel with the first motor/generator MG1 and operates the other rotation element of the first planetary gear set PG1 as a selective fixed element.

The second brake BK2 selectively connects another rotation element of the second planetary gear set PG2 with the transmission housing H so as to operate another rotation element as a selective fixed element.

The first and second planetary gear sets PG1 and PG2 and the first and second motor/generators MG1 and MG2 are disposed on the same axis.

The torque delivery apparatus consisting of the first and second clutches CL1 and CL2 and the first and second brakes BK1 and BK2 are conventional multi-plate friction elements of wet type that are operated by hydraulic pressure.

Herein, a clutch is a friction member which connects a rotation member with another rotation member, a brake is a friction member which connects a rotation member with a non-rotation member.

Constituent elements of a power transmission system according to various embodiments of the present invention will be described in detail.

The first planetary gear set PG1 is a single pinion planetary gear set, and includes a first sun gear S1, a first planet carrier PC1 rotatably supporting a first pinion P1 externally engaged with the first sun gear S1, and a first ring gear R1 internally engaged with the first pinion P1 as rotation elements thereof.

The second planetary gear set PG2 is a single pinion planetary gear set, and includes a second sun gear S2, a second planet carrier PC2 rotatably supporting a second pinion P2 externally engaged with the second sun gear S2, and a second ring gear R2 internally engaged with the second pinion P2 as rotation elements thereof.

The first sun gear S1 and the second sun gear S2 are directly connected, the first planet carrier PC1 and the second ring gear R2 are selectively connected, the first planet carrier PC1 is selectively connected to the input shaft IS that is an input member, and the second planet carrier PC2 is connected to the output gear OG that is an output member.

The first motor/generator MG1 is connected to the first ring gear R1 of the first planetary gear set PG1 so as to drive the first ring gear R1 or to be operated as a generator.

The second motor/generator MG2 is connected to the second sun gear S2 of the second planetary gear set PG2 so as to drive the second sun gear S2 or to be operated as a generator.

The first clutch CL1 is disposed between an output shaft of the engine ENG and the first planet carrier PC1 of the first planetary gear set PG1 so as to selectively input torque of the engine ENG to the first planet carrier PC1.

The second clutch CL2 is disposed between the first planet carrier PC1 of the first planetary gear set PG1 and the second ring gear R2 of the second planetary gear set PG2 so as to selectively input torque of the engine ENG to the second ring gear R2.

The first brake BK1 is disposed in parallel with the first motor/generator MG1 and operates the first ring gear R1 of the first planetary gear set PG1 as a selective fixed element.

The second brake BK2 is disposed between the second ring gear R2 of the second planetary gear set PG2 and the transmission housing H and operates the second ring gear R2 as a selective fixed element.

FIG. 2 is an operational chart of torque delivery apparatus at each operation mode applied to a power transmission system according to various embodiments of the present invention.

Referring to FIG. 2, torque delivery apparatus operated at each shift-speed will be described detail.

The second brake BK2 is operated at an EV1 mode.

The second clutch CL2 is operated at an EV2 mode.

The second clutch CL2 and the second brake BK2 are operated at an EV3 mode.

The first clutch CL1 and the second brake BK2 are operated at an input split mode.

The first clutch CL1 and the second clutch CL2 are operated at a compound split mode.

The first clutch CL1, the second clutch CL2, and the first brake BK1 are operated at a fixed shift-speed mode.

As described above, the power transmission system according to various embodiments of the present invention can realize three EV modes, two torque split modes, and one fixed shift-speed mode.

Figure 3:
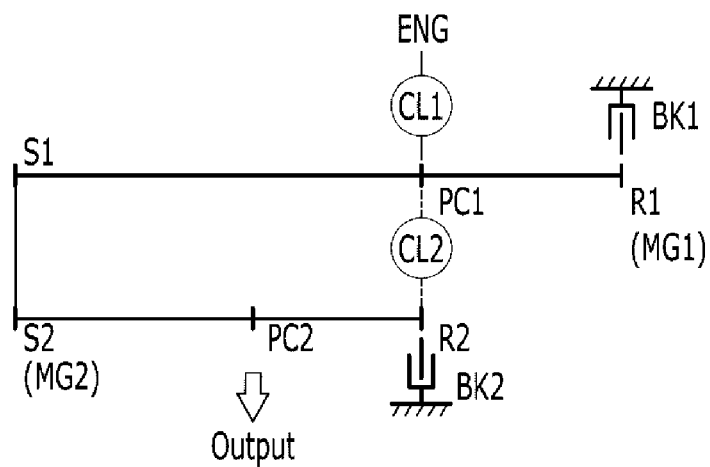
FIG. 3 is a schematic diagram for showing connections between constituent elements of an exemplary power transmission system according to the present invention.
Figure 4:
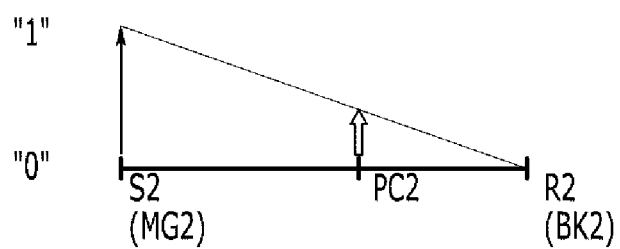
FIG. 4 is a lever diagram for an exemplary power transmission system according to the present invention at an EV1 mode.

FIG. 3 is a schematic diagram for showing connections between constituent elements of the power transmission system according to various embodiments of the present invention, and FIG. 4 is a lever diagram for a power transmission system according to various embodiments of the present invention at an EV1 mode.

Referring to FIG. 3 and FIG. 4, the second brake BK2 is operated at the EV1 mode.

The engine ENG maintains to be stopped, the first planetary gear set PG1 does not affect on the shifting, and the shifting is done by three rotation elements of the second planetary gear set PG2 at the EV1 mode.

That is, in a state that the second motor/generator MG2 operates so as to input torque thereof to the second sun gear S2, the second ring gear R2 is operated as a fixed element by operation of the second brake BK2. Therefore, a reduced speed is output through the second planet carrier PC2 that is an output element.

Figure 5:
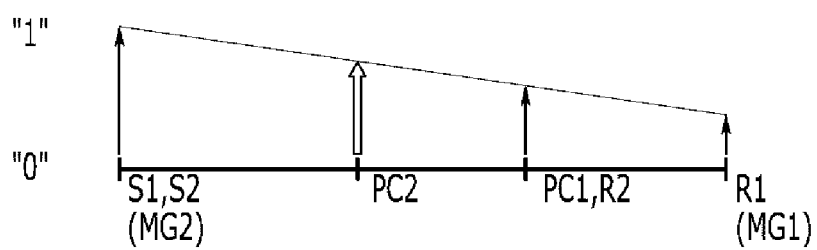
FIG. 5 is a lever diagram for an exemplary power transmission system according to the present invention at an EV2 mode.

FIG. 5 is a lever diagram for a power transmission system according to various embodiments of the present invention at an EV2 mode.

Referring to FIG. 3 and FIG. 5, the second clutch CL2 is operated at the EV2 mode.

Since the first planet carrier PC1 and the second ring gear R2 are connected by operation of the second clutch CL2, the first planetary gear set PG1 and the second planetary gear set PG2 are operated by four rotation elements.

At this state, the second motor/generator MG2 is operated so as to input torque thereof to the second sun gear S2, and the first motor/generator MG1 is operated according to a driving condition of the vehicle. Therefore, a reduced speed is output through the second planet carrier PC2 that is the output element.

Figure 6:
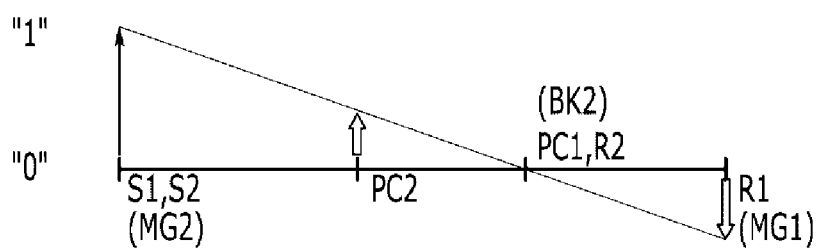
FIG. 6 is a lever diagram for an exemplary power transmission system according to various embodiments of the present invention at an EV3 mode.

FIG. 6 is a lever diagram for a power transmission system according to various embodiments of the present invention at an EV3 mode.

Referring to FIG. 3 and FIG. 6, the second clutch CL2 and the second brake BK2 are operated at an EV3 mode.

Since the first planet carrier PC1 and the second ring gear R2 are connected by operation of the second clutch CL2, the first planetary gear set PG1 and the second planetary gear set PG2 are operated by four rotation elements.

At this state, the second motor/generator MG2 is operated so as to input torque thereof to the second sun gear S2, the first planet carrier PC1 and the second ring gear R2 are operated as the fixed elements by operation of the second brake BK2. Therefore, a reduced speed is output through the second planet carrier PC2 that is the output element.

At this time, the first motor/generator MG1 rotates inversely.

Figure 7:
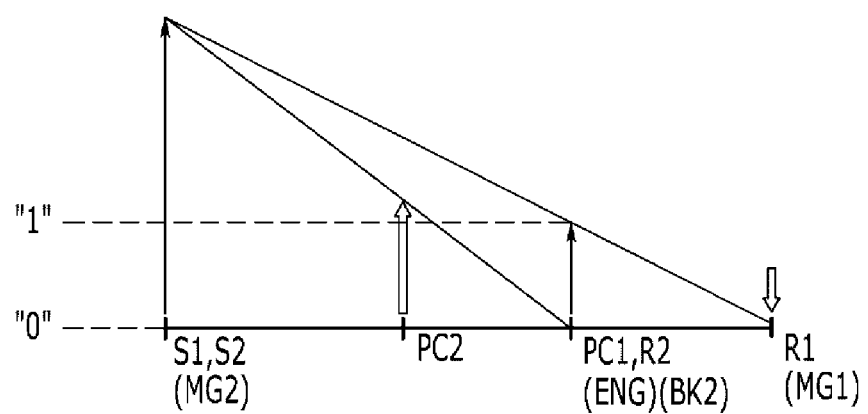
FIG. 7 is a lever diagram for an exemplary power transmission system according to various embodiments of the present invention at an input split mode.

FIG. 7 is a lever diagram for a power transmission system according to various embodiments of the present invention at an input split mode.

Referring to FIG. 3 and FIG. 7, the first clutch CL1 and the second brake BK2 are operated at the input split mode.

Then, torque of the engine ENG is input to the first planet carrier PC1 by operation of the first clutch CL1.

If the first motor/generator MG1 rotates with a low speed or is stopped at this time, an increased speed is delivered to the second sun gear S2 of the second planetary gear set PG2 through the first sun gear S1.

In a state that the increased speed is input to the second sun gear S2, the second ring gear R2 is operated as the fixed element by operation of the second brake BK2. Therefore, a changed speed is output through the second planet carrier PC2 that is the output element.

Figure 8:
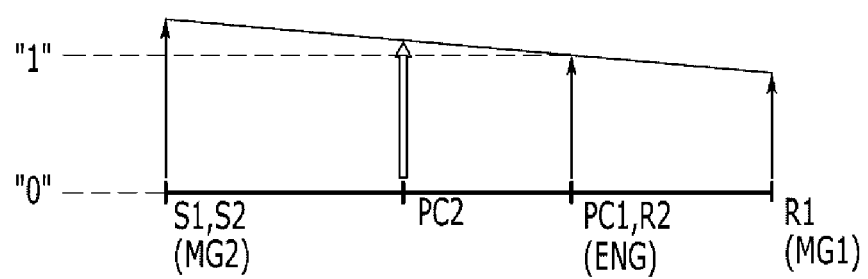
FIG. 8 is a lever diagram for an exemplary power transmission system according to various embodiments of the present invention at a compound split mode.

FIG. 8 is a lever diagram for a power transmission system according to various embodiments of the present invention at a compound split mode.

Referring to FIG. 3 and FIG. 8, the first clutch CL1 and the second clutch CL2 are operated at the compound split mode.

In this case, the first motor/generator MG1 and the second motor/generator MG2 are connected to the engine ENG or the output gear OG through the rotation elements of the planetary gear sets.

Therefore, the engine ENG, the first motor/generator MG1, and the second motor/generator MG2 can generate driving torque, one of them supplies torque to another of them so as to generate electricity, and all the speed ratios required for driving the vehicle can be obtained by changing their speeds suitably.

Figure 9:
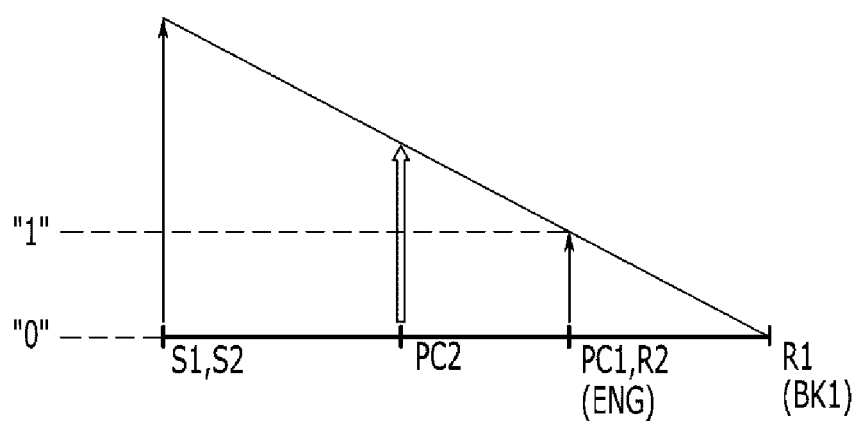
FIG. 9 is a lever diagram for an exemplary power transmission system according to various embodiments of the present invention at a fixed shift-speed mode.

FIG. 9 is a lever diagram for a power transmission system according to various embodiments of the present invention at a fixed shift-speed mode.

Referring to FIG. 3 and FIG. 9, the first clutch CL1, the second clutch CL2, and the first brake BK1 are operated at the fixed shift-speed mode.

Since the first planet carrier PC1 and the second ring gear R2 are connected by operation of the second clutch CL2, the first planetary gear set PG1 and the second planetary gear set PG2 are operated by four rotation elements.

At this state, torque of the engine ENG is input to the first planet carrier PC1 and the second ring gear R2, and the first ring gear R1 is operated as the fixed element by operation of the first brake BK1. Therefore, an increased speed by a predetermined speed ratio is output. That is, overdrive mode with a fixed speed ratio is achieved.

Figure 10:
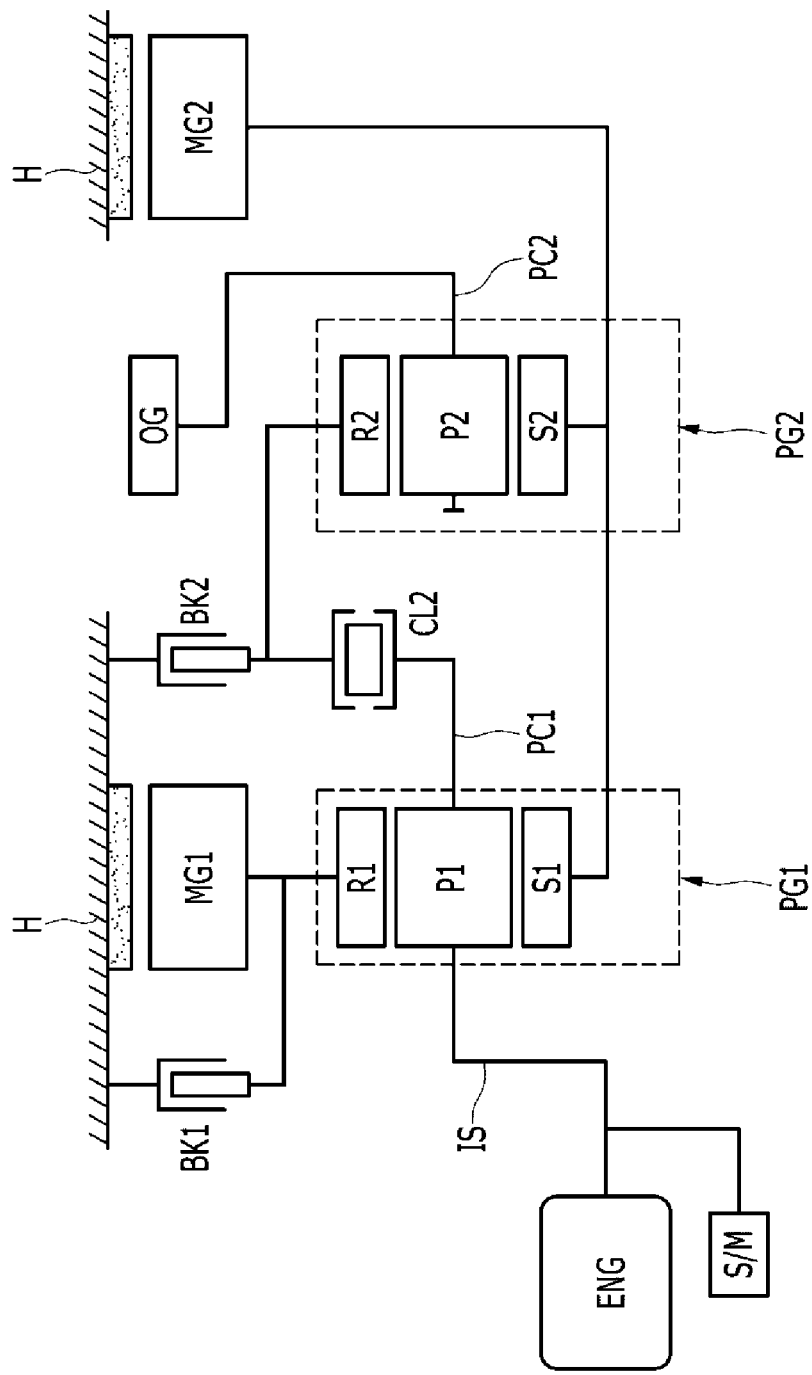
FIG. 10 is a schematic diagram of an exemplary power transmission system according to another exemplary embodiment of the present invention.

FIG. 10 is a schematic diagram of a power transmission system according to various embodiments of the present invention.

Referring to FIG. 10, a power transmission system according to various embodiments of the present invention does not include the first clutch CL1 mounted between the engine ENG and the input shaft IS. Other than this, structure and operation of various other embodiments of the present invention are the same as those of the above-described embodiments of the present invention. Therefore, detailed description will be omitted.

Various embodiments of the present invention achieve three EV modes, two torque split modes including an input split mode and a compound split mode, and one fixed shift-speed mode.

Various embodiments of the present invention achieve multi-mode type where fixed speed ratios and variable speed ratios are combined. Therefore, high efficiency may be achieved at all the speed ratios of a vehicle and fuel economy may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle, comprising:
    a first planetary gear set having a first sun gear, a first planet carrier, and a first ring gear as rotation elements thereof;
    a second planetary gear set having a second sun gear, a second planet carrier, and a second ring gear as rotation elements thereof;
    first and second motor/generators adapted to be operated as a motor or a generator; and
    a torque delivery apparatus including first and second clutches and first and second brakes,
    wherein:
        the first sun gear is directly connected to the second sun gear;
        the first planet carrier is directly connected to an input shaft selectively connected to an engine through the first clutch and is selectively connected to the second ring gear through the second clutch;
        the first ring gear is connected to the first motor/generator and is selectively connected to a transmission housing through a first brake, wherein rotation shafts of the first planet carrier and the first ring gear are continuously decoupled from each other;
        the second sun gear is connected to the second motor/generator;
        the second planet carrier is directly connected to an output gear; and
        the second ring gear is selectively connected to the transmission housing through the second brake, and
    wherein:
        the second brake is operated at an EV1 mode;
        the second clutch is operated at an EV2 mode;
        the second clutch and the second brake are operated at an EV3 mode;
        the first clutch and the second brake are operated at an input split mode;
        the first clutch and the second clutch are operated at a compound split mode; and
        the first clutch, the second clutch, and the first brake are operated at a fixed shift-speed mode.

2. The power transmission system of claim 1, wherein the first planetary gear set and the second planetary gear set are single pinion planetary gear sets.

3. A power transmission system of a hybrid electric vehicle, comprising:
an input shaft selectively connected to an engine;
a first planetary gear set having first, second, and third rotation elements, wherein the second rotation element is directly connected to the input shaft and the third rotation element is directly connected to a first motor/generator;
a second planetary gear set having fourth, fifth, and sixth rotation elements, wherein the fourth rotation element is directly connected to the first rotation element of the first planetary gear set and a second motor/generator, and the sixth rotation element is selectively connected to the second rotation element of the first planetary gear set;
an output gear connected to the fifth rotation element of the second planetary gear set;
a first clutch selectively connecting the engine with the input shaft;
a second clutch selectively connecting the second rotation element of the first planetary gear set with the sixth rotation element of the second planetary gear set;
a first brake interposed between the third rotation element of the first planetary gear set and a transmission housing; and
a second brake interposed between the sixth rotation element of the second planetary gear set and the transmission housing,
wherein the first planetary gear set is a single pinion planetary gear set having a first sun gear as the first rotation element, a first planet carrier as the second rotation element, and a first ring gear as the third rotation element,
wherein the first sun gear is directly connected to the fourth rotation element of the second planetary gear set,
wherein the first planet carrier is directly connected to the input shaft and is selectively connected to the sixth rotation element of the second planetary gear set,
wherein the first ring gear is connected to the first motor/generator and is selectively connected to the transmission housing through the first brake,
wherein the second rotation element and the third rotation element are continuously decoupled,
wherein the second brake is operated at an EV1 mode,
wherein the second clutch is operated at an EV2 mode,
wherein the second clutch and the second brake are operated at an EV3 mode,
wherein the first clutch and the second brake are operated at an input split mode,
wherein the first clutch and the second clutch are operated at a compound split mode, and
wherein the first clutch, the second clutch, and the first brake are operated at a fixed shift-speed mode.

4. A power transmission system of a hybrid electric vehicle, comprising:
a first planetary gear set having a first sun gear, a first planet carrier, and a first ring gear as rotation elements thereof;
a second planetary gear set having a second sun gear, a second planet carrier, and a second ring gear as rotation elements thereof;
first and second motor/generators adapted to be operated as a motor or a generator; and
a torque delivery apparatus including first and second clutches and first and second brakes,
wherein:
the first sun gear is directly connected to the second sun gear;
the first planet carrier is directly connected to an input shaft selectively connected to an engine through the first clutch and is selectively connected to the second ring gear through the second clutch;
the first ring gear is connected to the first motor/generator and is selectively connected to a transmission housing through a first brake, wherein rotation shafts of the first planet carrier and the first ring gear are continuously decoupled from each other;
the second sun gear is connected to the second motor/generator;
the second planet carrier is directly connected to an output gear; and
the second ring gear is selectively connected to the transmission housing through the second brake,
wherein the second brake is operated at an EV1 mode,
wherein the second clutch is operated at an EV2 mode,
wherein the second clutch and the second brake are operated at an EV3 mode,
wherein the first clutch and the second brake are operated at an input split mode,
wherein the first clutch and the second clutch are operated at a compound split mode, and
wherein the first clutch, the second clutch, and the first brake are operated at a fixed shift-speed mode.

5. A power transmission system of a hybrid electric vehicle, comprising:
a first planetary gear set having a first sun gear, a first planet carrier, and a first ring gear as rotation elements thereof;
a second planetary gear set having a second sun gear, a second planet carrier, and a second ring gear as rotation elements thereof;
first and second motor/generators adapted to be operated as a motor or a generator; and
a torque delivery apparatus including first and second clutches and first and second brakes,
wherein:
the first sun gear is directly connected to the second sun gear;
the first planet carrier is directly connected to an input shaft connected to an engine and is selectively connected to the second ring gear through the second clutch;
the first ring gear is connected to the first motor/generator and is selectively connected to a transmission housing through the first brake, wherein rotation shafts of the first planet carrier and the first ring gear are continuously decoupled from each other;
the second sun gear is connected to the second motor/generator;
the second planet carrier is directly connected to an output gear; and
the second ring gear is selectively connected to the transmission housing through the second brake,
wherein the second brake is operated at an EV1 mode,
wherein the second clutch is operated at an EV2 mode,
wherein the second clutch and the second brake are operated at an EV3 mode,
wherein the first clutch and the second brake are operated at an input split mode,
wherein the first clutch and the second clutch are operated at a compound split mode, and
wherein the first clutch, the second clutch, and the first brake are operated at a fixed shift-speed mode.

* * * * *